3,336,294
PREPARATION OF AZIRIDINES
Gordon R. Miller and George E. Ham, Lake Jackson, Tex., James E. Cobb, Bessemer, Ala., and Frederick R. Jensen, Orinda, Calif., assignors to The Dow Chemical Company, Midland, Mich., a corporation of Delaware
No Drawing. Filed Oct. 3, 1962, Ser. No. 228,029
17 Claims. (Cl. 260—239)

This is a continuation-in-part of our copending application Ser. No. 839,291, filed Sept. 11, 1959, and now abandoned.

This invention relates to aziridines and methods for their preparation.

The aziridines here contemplated are those having the formula

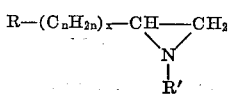

and are made by the reaction of ammonia or a primary aliphatic amine, R'NH$_2$, with an alkylene compound having the formula

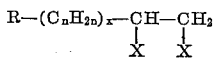

where in the above formulas R is H or phenyl, R' is H or an aliphatic radical containing up to about 10 carbon atoms and free of substituents reactive in the process disclosed herein, $n$ is an integer from 1 to about 10, $x$ is an integer from 0 to 1, being 1 when R is phenyl, and each X is a radical selected from the group consisting of halogens having an atomic number of from 17 to 35, —OSO$_3$H, —OSO$_2$R'' and —OSO$_3$—AY wherein R'' is a hydrocarbon radical, A is a vicinal alkylene radical containing 2 to 4 carbon atoms and Y is a halogen having an atomic number of from 17 to 35, i.e., chlorine or bromine.

Heretofore ethylene chloride and the like have been reacted with ammonia [see for instance, Curme and Lommen, U.S. Patent 1,832,534; Kirk and Othmer, Encyclopedia of Chemical Technology, vol. 1, pp. 831–832, Interscience Encyclopedia, Inc., New York; J. v. Braun, Ber. 70, 970 (1937)] but the only products have been ethylenediamine and polymers thereof.

It has now been discovered that alkylene halides, sulfates and sulfonates of the above-defined class can be condensed with ammonia or a primary aliphatic amine to produce the corresponding aziridine. The essential features of the process are that a suitable acid acceptor be present, that the reaction be conducted below the temperature at which the aziridine decomposes, and that the aziridine be separated before its polymerizes or is otherwise consumed.

The amino compound, R'NH$_2$, may be ammonia or any primary aliphatic amine free of substituents reactive in the process. Among inert substituent groups are phenyl or other aryl groups, hydroxyl, carboxyl, cyano, cycloalkyl, alkoxy, alkenyl and alkynyl groups. Thus, suitable amines include the alkylamines, for example, methyl ethyl, propyl, butyl, octyl and decylamines, including the various straight- and branched-chain isomers; the cycloalkylamines, such as cyclopentylamine and cyclohexylamine; the alkenylamines, such as allylamine, crotylamine and 2-methallylamine; the aralkylamines, such as benzylamine and phenethylamine; the alkanolamines, such as ethanolamine, 2-hydroxypropylamine and 4-hydroxybutylamine; the alkoxyalkylamines, such as 2-methoxyethylamine, 2-ethoxypropylamine, and 2(2-hydroxyethoxy) ethylamine; 3-phenoxy-2-butylamine; the cyanoalkylamines, such as 2-cyanoethylamine and 5-cyanopentylamine; the amino acids, such as glycine, alanine, tyrosine, threonine, proline, tryptophane and lysine. Di-primary amines, such as trimethylenediamine, hexamethylenediamine and the like are operable to produce the corresponding mono- and bis-aziridines.

The alkylene compound, the reactant having the formula

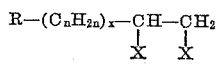

may be substantially any compound corresponding to this formula. Suitable compounds include ethylene chloride, ethylene bromide, ethylene chlorobromide, 1,2-propylene chloride, 1,2-butylene bromide, 1,2-dodecylene bromide, bis(2-chloroethyl) sulfate, 2-bromoethyl benzenesulfonate, bis(2-bromobutyl) sulfate, 2-bromopropyl p-toluenesulfonate, 2-chloropropyl methanesulfonate, 2-bromoethyl naphthalenesulfonate, and the like.

The process of the invention may be carried out under a wide variety of conditions depending on the particular reactants used. Thus, it is operable at any temperature from ordinary room temperature, or even lower, up to that at which decomposition of the aziridine becomes excessive. The latter varies somewhat, depending on the particular reactants and their proportions and especially on the efficacy of the acid acceptor, but is ordinarily not higher than about 200° C. At low temperatures such as 0–20° C., aziridines are produced but only at low rates, thus requiring long reaction periods to attain practical conversions. On the other hand, at high temperatures, such as 150–200° C., conversion is rapid but at the same time decomposition of the product is also rapid; hence, the reaction period must be short and, even so, the yield is reduced. For these reasons, we generally prefer to operate at a temperature of about 20–150° C.

The reaction time should be inversely related to the temperature and is ordinarily chosen to maximize the conversion to the desired product. Thus, at temperatures above 100° C. the reaction time might suitably be only a few minutes while at temperatures below 50° C. it might well be several hours, or even days.

The ratio of reactants can be varied quite widely and some aziridine is produced when the reactants are mixed in any ratio. As a practical matter, it is generally preferred to use at least a stoichiometric amount of the amino compound and, especially when it is ammonia, most suitably a considerable excess of amino compound. Since for each mole of aziridine produced there are also produced two equivalents of acid, HX, it is necessary to provide at least sufficient acid acceptor to neutralize this acid. Frequently, the most convenient acid acceptor is the amino compound used as a reactant. When the amino compound is thus used both as a reactant and as an acid acceptor it is obviously necessary to provide a sufficient amount to serve both purposes. Alternatively, the acid acceptor may be an inorganic base, such as an alkali or alkaline earth metal base, i.e., oxide or hydroxide.

Ordinarily, no solvent is needed or used in carrying out the reaction of the invention, although any inert solvent may be used if desired.

Water may be present in minor amounts, e.g. 0.01 to 1.0 mole per mole of amino compound, without adverse effect; in fact it frequently increases the reaction rate without reducing the yield of aziridine. Alkanols, e.g., methanol, frequently decrease the reaction rate.

When highly volatile reactants and/or solvents are used, especially at elevated temperatures, it is necessary or desirable to conduct the reaction in a closed vessel at superatmospheric pressure. Such pressure is ordinarily the autogenous pressure of the reaction mixture, though the vessel may be pressurized with an inert gas if desired.

The practice of the invention is illustrated by the following examples.

In all the examples the percent conversion reported is the percent of the alkylene compound destroyed in the reaction while the percent yield is the yield based on the alkylene compound converted (i.e., destroyed.)

Example 1

A stainless steel reactor was charged with 155.7 g. of finely powdered calcium hydroxide and 130.3 g. (1.32 moles) ethylene chloride and sealed. Anhydrous ammonia (600 g., 35.3 moles) was then charged into the reactor, the stirrer was activated and the reactor temperature was raised to 100° C. After 30 minutes at 100° the reactor was quickly cooled to 20° C. and the excess ammonia flashed into a Dry Ice-cooled receiver containing 100 ml. of toluene. The receiver was then replaced with one cooled in liquid nitrogen and the system evacuated to an ultimate pressure of 1 mm. Heat was then applied to the reactor and the temperature of the reactor was gradually raised to 200° C., the pressure being held at 1 mm.

Analysis of the dry residue in the reactor showed chloride ion corresponding to 54.8% of the ethylene chloride charged.

The ammonia content of the second receiver was flashed into the first, thus leaving a residue of aziridine in the second. The contents of the first trap were partially fractionated by distillation to remove the ammonia, the residue being a toluene solution containing an additional amount of aziridine. Thus, 55% of the ethylene chloride was consumed and the yield of aziridine, based on ethylene chloride consumed, was 64%.

Examples 2–19

*General procedure.*—Mixtures of ethylene chloride and ammonia were heated in a closed vessel and aliquot samples of the respective reaction mixtures were withdrawn from time to time and analyzed. Results are summarized in the following table which gives the mole ratio of ammonia to ethylene chloride in each starting mixture, the time and temperature of heating up to the point of withdrawal of a sample of the reaction mixture for analysis, and the percent conversion of ethylene chloride and percent yield of aziridine calculated on a basis of the analysis.

TABLE I

| Ex. No. | Temp., °C. | Time | Ratio $NH_3/C_2H_4Cl_2$ | Conversion of Ethylene Chloride, Percent | Yield of Aziridine, Percent |
|---|---|---|---|---|---|
| 2 | 110 | 6 min | 30 | 18 | 52 |
| 3 | 110 | 9 min | 30 | 34 | 28 |
| 4 | 95 | 10 min | 30 | 15 | 68 |
| 5 | 95 | 20 min | 30 | 42 | 37 |
| 6 | 95 | 30 min | 30 | 70 | 13 |
| 7 | 85 | 20 min | 40 | 21 | 67 |
| 8 | 85 | 30 min | 40 | 32 | 72 |
| 9 | 85 | 20 min | 60 | 19 | 64 |
| 10 | 85 | 30 min | 60 | 33 | 69 |
| 11 | 75 | 20 min | 20 | 9 | 70 |
| 12 | 75 | 30 min | 20 | 18 | 71 |
| 13 | 75 | 60 min | 60 | 38 | 68 |
| 14 | 40 | 10.4 hrs | 30 | 52 | 73 |
| 15 | 31 | 24.5 hrs | 10 | 54 | 50 |
| 16 | 31 | 24.3 hrs | 20 | 60 | 54 |
| 17 | 20 | 43.8 hrs | 10 | 37 | 66 |
| 18 | 20 | 45.0 hrs | 30 | 40 | 88 |
| 19 | 20 | 80.0 hrs | 30 | 77 | 68 |

Example 20

When propylene chloride (1,2-dichloropropane) was heated at 100° C. for 2 hours with 23 molar equivalents of ammonia and 3 molar equivalents of calcium oxide and the products analyzed substantially as described in Example 1, 2-methylaziridine was obtained in 62% yield.

Example 21

Use of calcium oxide as an acid acceptor and replacement of ethylene chloride in the process of Examples 1–19 with 2-chloroethyl benzenesulfonate, ammonium 2-chloroethyl sulfate or bis(2-chloroethyl) sulfate resulted in the production of aziridine, though usually in somewhat reduced yields.

Example 22

When 24.8 g. of ethylene chloride, 182.9 g. of n-butylamine and 33.6 g. of calcium oxide were refluxed, with stirring, for 26 hours, a 43% yield of 1-(n-butyl)-aziridine was obtained.

Example 23

When a 1:1 molar ratio of ethylene chloride and ammonia was heated at 100–110° C. for 2.5 hours, aziridine was found in the product.

To further illustrate the production of aziridine from various ethylene compounds, a series of experiments was made wherein ammonia was reacted with a variety of alkylene compounds using procedure otherwise similar to that hereinbefore described with regard to Examples 2–19. The reaction conditions in, and the results of such tests are shown in Table II.

TABLE II.—REACTION OF $NH_3$ WITH ALKYLENE COMPOUNDS

| Example No. | Alkylene Compound | Starting Mole Ratio, $NH_3$/Alkylene Compound | Reaction Conditions | | Conversion, Percent | Yield, Percent |
|---|---|---|---|---|---|---|
| | | | Time, Min. | Temp., °C. | | |
| 24 | Ethylene bis(benzenesulfonate) | 60 | 150 | 0–5 | 44 | 60 |
| 25 | do | 60 | 521 | 0–5 | 91 | 63 |
| 26 | do | 60 | 93 | 20–23 | 60 | 69 |
| 27 | do | 60 | 198 | 20–23 | 95 | 55 |
| 28 | Ethylene bromide | 30 | 58 | 0–5 | 14 | 78 |
| 29 | do | 30 | 246 | 0–5 | 67 | 81 |
| 30 | do | 30 | 15 | 20–23 | 26 | 100 |
| 31 | do | 30 | 77 | 20–23 | 98 | 80 |
| 32 | 2-chloroethyl benzenesulfonate | 60 | 107 | 20–23 | 68 | 15 |
| 33 | Bis(2-chloroethyl)sulfate | 60 | 306 | 0–5 | 15 | 74 |
| 34 | do | 60 | 1,620 | 0–5 | 61 | 56 |

In another series of tests, various primary amines were reacted with ethylene bromide, one liter of amine being used per gram mole of ethylene bromide and the reaction temperature being 21–24° C. Results are shown in Table III.

TABLE III.—REACTIONS OF AMINES WITH ETHYLENE BROMIDE

| Example No. | Amine | Reaction Time, Hours | Conversion, Percent | Yield, Percent |
|---|---|---|---|---|
| 35 | n-Butyl | 5 | 13 | 71 |
| 36 | do | 75 | 95 | 59 |
| 37 | n-Hexyl | 23 | 36 | 92 |
| 38 | do | 71 | 77 | 75 |
| 39 | Cyclohexyl | 25 | 30 | 92 |
| 40 | do | 71 | 64 | 90 |
| 41 | Benzyl | 26 | 44 | 75 |
| 42 | do | 48 | 67 | 52 |
| 43 | 2-hydroxyethyl | 5 | 24 | 95 |
| 44 | do | 30 | 81 | 78 |
| 45 | 3-aminopropyl | 1 | 23 | 86 |
| 46 | do | 5 | 73 | 84 |
| 47 | 2(n-propoxy)ethyl | 48 | 22 | 50 |
| 48 | Na salt of β-alanine | 26 | 49 | 100 |
| 49 | do | 45 | 68 | 100 |
| 50 | Allyl | 30 | 66 | 51 |

Table IV shows the results of a series of experiments wherein n-butylamine was reacted with a variety of alkylene compounds. The mole ratio of amine to alkylene compound was 10:1 and the reaction temperature was about 23° C. In each experiment ethanol was used as a solvent, the proportion being 2 liters per mole of alkylene compounds.

TABLE IV.—REACTION OF n-BUTYLAMINE WITH ALKYLENE COMPOUNDS $R-(CH_2)_n-CHBr-CH_2Br$

| Example No. | Alkylene Compound | | Reaction Conditions | | Conversion, percent | Yield, percent |
|---|---|---|---|---|---|---|
| | R | n | Time, Hr. | Temp., ° C. | | |
| 51 | Phenyl | 2 | 77 | 23 | 12 | 55 |
| 52 | do | 2 | 696 | 23 | 56 | 84 |
| 53 | H | 6 | 4 | 83 | 53 | 47 |

Polar solvents, such as alcohols, reduce the rate of formation of aziridines but also reduce the rate of formation of by-products. In some cases, especially when amines containing large non-polar groups are used, the latter effect out-weighs the former and the over-all effect is beneficial. This trend is shown by the experiments summarized in Table V, wherein various amounts of ethanol were present during the reaction of n-butylamine with ethylene bromide. The amine-bromide ratio was 10:1 and the reaction temperature was 20–25° C.

TABLE V.—EFFECT OF ETHANOL ON REACTION OF n-BUTYLAMINE WITH ETHYLENE BROMIDE

| Ex. No. | Amount Ethanol, l./mol. Ethylene Bromide | Half-Time for Reaction, Hr. | Percent Yield at 90% Conversion |
|---|---|---|---|
| 54 | 0.0 | 0.47 | 62 |
| 55 | .5 | 2.35 | 81 |
| 56 | 1.0 | 7.10 | 79 |
| 57 | 2.0 | 24.0 | 60 |

We claim:

1. A process for making an aziridine having the formula:

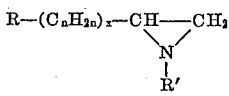

comprising (1) reacting by contacting an amino compound having the formula $R'NH_2$ with an alkylene compound having the formula

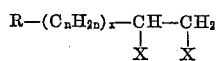

wherein the above formula R is a radical selected from the group consisting of hydrogen and phenyl radicals; R' is a radical selected from the group consisting of hydrogen and aliphatic radicals containing up to 10 carbon atoms and free of substituents other than amino, aryl, hydroxyl, carboxyl, cyano, cycloalkyl, alkoxy, alkenyl and alkynyl groups; n is an integer from 1 to 10; x is an integer from 0 to 1, being 1 when R is phenyl; and each X is a radical independently selected from the group consisting of halogens having an atomic number from 17 to 35, —$OSO_3H$, —$OSO_2R''$ and —$OSO_3$—A—X', wherein R'' is a hydrocarbon radical containing up to 10 carbon atoms, A is a vicinal alkylene radical containing 2 to 4 carbon atoms and X' is a halogen having an atomic number from 17 to 35, said process being conducted in the presence of acid acceptor selected from the group consisting of ammonia, primary aliphatic amines, alkali metal bases and alkaline earth metal bases, and (2) separating the thus formed corresponding aziridine.

2. The process of claim 1 wherein the amino compound is ammonia.

3. The process of claim 1 wherein each X is a halogen of atomic number 17 to 35.

4. The process of claim 1 wherein the acid acceptor is the amino compound $R'NH_2$.

5. The process of claim 1 wherein the molar ratio of the amino compound to the alkylene compound is at least 3:1.

6. The process of claim 1 wherein the temperature of the reaction is 0–200° C.

7. The process of claim 1 wherein the reaction is effected in the presence of 0.01 to 1 mole of water per mole of the amino compound.

8. The process of claim 1 wherein an alkaline earth metal base is present.

9. The process of claim 8 wherein the base is calcium hydroxide.

10. The process for making aziridine comprising reacting by contacting an ethylene dihalide wherein the halogens have an atomic number from 17 to 35 with at least an equimolar amount of ammonia in the presence of an acid acceptor selected from the group consisting of ammonia, alkali metal bases and alkaline earth metal bases and separating the thus formed aziridine.

11. The process defined in claim 10 wherein the ethylene dihalide is ethylene chloride.

12. The process defined in claim 10 wherein the ethylene dihalide is ethylene bromide.

13. The process defined in claim 10 wherein the temperature is 0–150° C.

14. The process defined in claim 10 wherein the molar ratio of ammonia to ethylene dihalide is at least 3:1.

15. The process defined in claim 10 wherein the acid acceptor is an alkaline earth metal base.

16. The process defined in claim 10 wherein the acid acceptor is an alkali metal base.

17. The process for making aziridine comprising reacting by contacting ethylene chloride with at least 3 molar equivalents of ammonia at a temperature of not higher than 110° C. and in the presence of 0.01 to 1 mole of water per mole of ammonia, distilling the excess ammonia and the thus formed aziridine from the reaction mixture and separating the aziridine from the ammonia by fractional distillation.

References Cited
UNITED STATES PATENTS

| | | | |
|---|---|---|---|
| 2,892,871 | 6/1959 | Filbey et al. | 260—239 |
| 3,072,636 | 1/1963 | Furst et al. | 260—239 |

OTHER REFERENCES

Elderfield: Heterocyclic Compounds, vol. 1 (New York, 1950), pp. 62–65.

ALEX MAZEL, *Primary Examiner.*

NICHOLAS S. RIZZO, *Examiner.*

A. D. ROLLINS, *Assistant Examiner.*